(12) United States Patent
Hunter et al.

(10) Patent No.: US 6,952,685 B1
(45) Date of Patent: Oct. 4, 2005

(54) MUSIC DISTRIBUTION SYSTEM AND ASSOCIATED ANTIPIRACY PROTECTION

(75) Inventors: Charles E. Hunter, Hilton Head, SC (US); John H. Hebrank, Durham, NC (US); Kelly C. Sparks, Morrisville, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 0 days.

(21) Appl. No.: 09/487,978

(22) Filed: Jan. 20, 2000

Related U.S. Application Data (63) Continuation-in-part of application No. 09/476,078, filed on Dec. 30, 1999, which is a continuation-in-part of application No. 09/436,281, filed on Nov. 8, 1999, now abandoned, which is a continuation-in-part of application No. 09/385,671, filed on Aug. 27, 1999.

(51) Int. Cl.[7] .............................................. G06F 17/60
(52) U.S. Cl. .......................... 705/58; 705/59; 713/160; 713/171; 713/161; 380/202; 380/203; 380/241
(58) Field of Search .............................. 705/58, 59, 26, 705/27, 51, 71; 713/160, 161, 171, 168, 193, 200; 380/202, 203, 241, 279, 277, 201; 709/227, 228, 229; 711/100, 163; 369/30; 340/825.31, 825.34, 825.35

(56) References Cited

U.S. PATENT DOCUMENTS

| | | |
|---|---|---|
| 3,373,517 A | 3/1968 | Halperin |
| 3,376,465 A | 4/1968 | Corpew |
| 3,848,193 A | 11/1974 | Martin et al. .................. 325/53 |
| 3,941,926 A | 3/1976 | Slobodzian et al. .......... 178/7.3 |
| 3,983,317 A | 9/1976 | Glorioso ...................... 178/6.6 |
| 3,993,955 A | 11/1976 | Belcher et al. .............. 325/308 |
| 4,094,010 A | 6/1978 | Pepperl et al. ............... 365/215 |
| 4,155,042 A | 5/1979 | Permut et al. ................. 325/64 |
| 4,332,022 A | 5/1982 | Ceshkovsky et al. .......... 369/44 |
| 4,368,485 A | 1/1983 | Midland ....................... 358/64 |
| 4,476,488 A | 10/1984 | Merrell ......................... 358/86 |
| 4,536,791 A | 8/1985 | Campbell et al. ........... 358/122 |
| 4,559,480 A | 12/1985 | Nobs ........................... 315/324 |
| 4,575,750 A | 3/1986 | Callahan ...................... 358/86 |
| 4,595,950 A | 6/1986 | Lofberg |
| 4,654,482 A | 3/1987 | DeAngelis .................... 379/95 |
| 4,716,410 A | 12/1987 | Nozaki .................. 340/825.52 |
| 4,734,779 A | 3/1988 | Levis et al. ................. 358/231 |
| 4,734,858 A | 3/1988 | Schlafly ...................... 364/408 |

(Continued)

FOREIGN PATENT DOCUMENTS

| | | | | |
|---|---|---|---|---|
| EP | 0 756 423 A1 | 1/1997 | ......... | H04N/7/173 |
| EP | 0 683 943 B1 | 9/1998 | | |
| EP | 0975111 A2 * | 7/1999 | | |

(Continued)

OTHER PUBLICATIONS

US 5,825,354, 10/1998, Ahmad et al. (withdrawn)
"Wink Television Press Room," http://www.wink.com/contents/PressReleases.shtml, downloaded and printed on May 14, 2002.

(Continued)

*Primary Examiner*—Pierre E. Elisca
(74) *Attorney, Agent, or Firm*—Woodcock Washburn LLP (57) ABSTRACT

Music is blanket transmitted (for example, via satellite downlink transmission) to each customer's computer-based user station. Customers preselect from a list of available music in advance using an interactive screen selector, and pay only for music that they choose to have recorded for unlimited playback, for example, by a "CD burner". An "ID tag" is woven into the recorded music so that any illegal copies therefrom may be traced to the purchase transaction.

1 Claim, 5 Drawing Sheets

U.S. PATENT DOCUMENTS

| | | | |
|---|---|---|---|
| 4,761,641 A | 8/1988 | Schreiber | 340/717 |
| 4,789,863 A | 12/1988 | Bush | 340/5.9 |
| 4,797,913 A | 1/1989 | Kaplan et al. | 379/91 |
| 4,809,325 A | 2/1989 | Hayashi et al. | 380/234 |
| 4,812,843 A | 3/1989 | Champion, III et al. | 340/905 |
| 4,829,569 A * | 5/1989 | Seth-Smith et al. | 380/10 |
| 4,847,825 A | 7/1989 | Levine | |
| 4,862,268 A | 8/1989 | Campbell et al. | 358/141 |
| 4,908,713 A | 3/1990 | Levine | |
| 4,949,187 A | 8/1990 | Cohen | |
| 5,046,090 A | 9/1991 | Walker et al. | |
| 5,051,822 A | 9/1991 | Rhoades | 358/86 |
| 5,073,925 A | 12/1991 | Nagata et al. | |
| 5,107,107 A | 4/1992 | Osborne | 250/231.14 |
| 5,121,430 A | 6/1992 | Ganzer et al. | 380/48 |
| 5,123,046 A | 6/1992 | Levine | |
| 5,133,079 A | 7/1992 | Ballantyne et al. | |
| 5,182,669 A | 1/1993 | Chikuma et al. | 359/241 |
| 5,191,573 A | 3/1993 | Hair | 369/84 |
| 5,214,793 A | 5/1993 | Conway et al. | 455/49.1 |
| 5,233,423 A | 8/1993 | Jernigan et al. | 358/181 |
| 5,235,587 A | 8/1993 | Bearden et al. | |
| 5,251,193 A | 10/1993 | Nelson et al. | 369/44.12 |
| 5,257,017 A | 10/1993 | Jones et al. | 345/13 |
| 5,260,778 A | 11/1993 | Kauffman et al. | 358/86 |
| 5,274,762 A | 12/1993 | Peterson et al. | 395/200 |
| 5,283,731 A | 2/1994 | Lalonde et al. | |
| 5,297,204 A | 3/1994 | Levine | |
| 5,311,423 A | 5/1994 | Clark | |
| 5,319,735 A | 6/1994 | Preuss et al. | |
| 5,355,302 A | 10/1994 | Martin et al. | 364/410 |
| 5,365,282 A | 11/1994 | Levine | |
| 5,373,330 A | 12/1994 | Levine | |
| 5,414,756 A | 5/1995 | Levine | |
| 5,418,713 A | 5/1995 | Allen | 364/403 |
| 5,420,647 A | 5/1995 | Levine | |
| 5,420,923 A | 5/1995 | Beyers, II et al. | 380/20 |
| 5,428,606 A | 6/1995 | Moskowitz | |
| 5,438,355 A | 8/1995 | Palmer | 725/110 |
| 5,465,291 A | 11/1995 | Barrus et al. | 379/67 |
| 5,469,020 A | 11/1995 | Herrick | 313/511 |
| 5,469,206 A | 11/1995 | Strubbe et al. | 348/7 |
| 5,473,584 A | 12/1995 | Oshima | 369/32 |
| 5,486,819 A | 1/1996 | Horie | 340/905 |
| 5,495,283 A | 2/1996 | Cowe | 348/9 |
| 5,497,186 A | 3/1996 | Kawasaki | 348/6 |
| 5,497,479 A | 3/1996 | Hornbuckle | 395/491 |
| 5,508,815 A | 4/1996 | Levine | |
| 5,512,935 A | 4/1996 | Majeti et al. | 348/9 |
| 5,513,260 A | 4/1996 | Ryan | |
| 5,530,751 A | 6/1996 | Morris | |
| 5,532,920 A | 7/1996 | Hartrick et al. | |
| 5,543,856 A | 8/1996 | Rosser et al. | 348/578 |
| 5,557,541 A | 9/1996 | Schulhof et al. | 364/514 |
| 5,559,549 A | 9/1996 | Hendricks et al. | |
| 5,565,909 A | 10/1996 | Thibadeau et al. | 348/9 |
| 5,568,272 A | 10/1996 | Levine | |
| 5,592,511 A | 1/1997 | Schoen et al. | |
| 5,592,551 A | 1/1997 | Lett et al. | |
| 5,592,626 A | 1/1997 | Papadimitriou et al. | |
| 5,600,839 A | 2/1997 | MacDonald | 395/750 |
| 5,610,653 A | 3/1997 | Abecassis | 348/170 |
| 5,612,741 A | 3/1997 | Loban et al. | 348/383 |
| 5,619,247 A * | 4/1997 | Russo | 725/104 |
| 5,621,840 A | 4/1997 | Kawamura et al. | 386/68 |
| 5,621,863 A | 4/1997 | Boulet et al. | 395/124 |
| 5,627,895 A | 5/1997 | Owaki | |
| 5,628,050 A | 5/1997 | McGraw et al. | 455/12.1 |
| 5,630,067 A | 5/1997 | Kindell et al. | 395/200.09 |
| 5,638,113 A | 6/1997 | Lappington et al. | 348/12 |
| 5,640,453 A | 6/1997 | Schuchman et al. | |
| 5,644,859 A | 7/1997 | Hsu | 40/545 |
| 5,646,603 A | 7/1997 | Nagata et al. | |
| 5,646,997 A | 7/1997 | Barton | |
| 5,654,747 A * | 8/1997 | Ottesen et al. | 725/1 |
| 5,659,366 A | 8/1997 | Kerman | 348/460 |
| 5,659,613 A | 8/1997 | Copeland et al. | |
| 5,661,516 A | 8/1997 | Carles | 348/8 |
| 5,664,018 A | 9/1997 | Leighton | |
| 5,675,734 A | 10/1997 | Hair | 395/200.01 |
| 5,684,918 A | 11/1997 | Abecassis | |
| 5,686,954 A | 11/1997 | Yoshinobu et al. | |
| 5,689,799 A | 11/1997 | Dougherty et al. | 455/2 |
| 5,692,214 A | 11/1997 | Levine | |
| 5,701,161 A | 12/1997 | Williams et al. | 348/468 |
| 5,701,383 A | 12/1997 | Russo et al. | |
| 5,701,397 A | 12/1997 | Steimle et al. | 395/27 |
| 5,710,869 A | 1/1998 | Godefroy et al. | 395/21 |
| 5,717,814 A | 2/1998 | Abecassis | |
| 5,717,832 A | 2/1998 | Steimle et al. | 395/24 |
| 5,721,827 A | 2/1998 | Logan et al. | 395/200.47 |
| 5,721,951 A | 2/1998 | DorEl | |
| 5,724,062 A | 3/1998 | Hunter | 345/102 |
| 5,724,091 A | 3/1998 | Freeman et al. | |
| 5,724,525 A | 3/1998 | Beyers, II et al. | 395/240 |
| 5,729,214 A | 3/1998 | Moore | |
| 5,734,413 A | 3/1998 | Lappington et al. | |
| 5,740,326 A | 4/1998 | Boulet et al. | 395/27 |
| 5,748,716 A | 5/1998 | Levine | |
| 5,758,257 A | 5/1998 | Herz et al. | |
| 5,760,820 A | 6/1998 | Eda et al. | 348/9 |
| 5,761,606 A | 6/1998 | Wolzien | |
| 5,781,734 A | 7/1998 | Ohno et al. | 395/200.47 |
| 5,790,202 A | 8/1998 | Kummer et al. | |
| 5,790,937 A | 8/1998 | Gütle | |
| 5,799,285 A | 8/1998 | Klingman | |
| 5,805,154 A | 9/1998 | Brown | 345/327 |
| 5,805,763 A | 9/1998 | Lawler et al. | |
| 5,809,139 A | 9/1998 | Girod et al. | |
| 5,818,806 A | 10/1998 | Wong et al. | |
| 5,822,432 A | 10/1998 | Moskowitz et al. | |
| 5,825,407 A | 10/1998 | Cowe et al. | 348/6 |
| 5,826,123 A | 10/1998 | Lai | 396/446 |
| RE35,954 E | 11/1998 | Levine | |
| 5,832,287 A | 11/1998 | Atalla | |
| 5,835,896 A | 11/1998 | Fisher et al. | 705/37 |
| 5,841,979 A | 11/1998 | Schulhof et al. | |
| 5,845,083 A | 12/1998 | Hamadani et al. | 395/200.61 |
| 5,848,129 A | 12/1998 | Baker | |
| 5,848,155 A | 12/1998 | Cox | |
| 5,848,352 A | 12/1998 | Dougherty et al. | 455/5.1 |
| 5,854,779 A | 12/1998 | Johnson et al. | 369/59 |
| 5,860,068 A | 1/1999 | Cook | |
| 5,870,717 A | 2/1999 | Wiecha | |
| 5,874,985 A | 2/1999 | Matthews, III | 348/7 |
| 5,889,868 A | 3/1999 | Moskowitz et al. | |
| 5,890,136 A | 3/1999 | Kipp | |
| 5,897,622 A | 4/1999 | Blinn et al. | |
| 5,898,384 A | 4/1999 | Alt et al. | 340/825.36 |
| 5,899,980 A | 5/1999 | Wilf et al. | 705/26 |
| 5,903,878 A | 5/1999 | Talati et al. | |
| 5,905,800 A | 5/1999 | Moskowitz et al. | |
| 5,909,492 A | 6/1999 | Payne et al. | |
| 5,915,018 A | 6/1999 | Aucsmith | 380/4 |
| 5,915,027 A | 6/1999 | Cox et al. | |
| 5,915,068 A | 6/1999 | Levine | |
| 5,918,213 A * | 6/1999 | Bernard et al. | 705/26 |
| 5,930,369 A | 7/1999 | Cox et al. | |
| 5,933,798 A | 8/1999 | Linnartz | |
| 5,934,795 A | 8/1999 | Rykowski et al. | 362/309 |
| 5,940,135 A | 8/1999 | Petrovic et al. | |

| | | |
|---|---|---|
| 5,940,807 A | 8/1999 | Purcell |
| 5,943,670 A | 8/1999 | Prager |
| 5,946,665 A | 8/1999 | Suzuki et al. |
| 5,949,885 A | 9/1999 | Leighton |
| 5,959,945 A * | 9/1999 | Kleiman ............ 369/30 |
| 5,960,081 A | 9/1999 | Vynne et al. |
| 5,960,411 A | 9/1999 | Hartman et al. |
| 5,963,264 A | 10/1999 | Jackson |
| 5,963,915 A | 10/1999 | Kirsch |
| 5,963,917 A | 10/1999 | Ogram |
| 5,966,440 A | 10/1999 | Hair ............ 380/4 |
| 5,966,697 A | 10/1999 | Fergerson et al. |
| 5,969,283 A * | 10/1999 | Looney et al. ....... 84/609 |
| 5,969,715 A | 10/1999 | Dougherty et al. ...... 345/327 |
| 5,970,471 A | 10/1999 | Hill |
| 5,970,472 A | 10/1999 | Allsop et al. |
| 5,970,473 A | 10/1999 | Gerszberg et al. |
| 5,970,474 A | 10/1999 | LeRoy et al. |
| 5,970,475 A | 10/1999 | Barnes et al. |
| 5,974,396 A | 10/1999 | Anderson et al. ........ 705/10 |
| 5,978,775 A | 11/1999 | Chen |
| 5,983,199 A | 11/1999 | Kaneko |
| 5,983,200 A | 11/1999 | Slotznick |
| 5,983,201 A | 11/1999 | Fay |
| 5,988,078 A | 11/1999 | Levine |
| 5,992,888 A | 11/1999 | North et al. ........ 283/56 |
| 6,002,772 A | 12/1999 | Saito |
| 6,013,007 A | 1/2000 | Root et al. ........ 482/8 |
| 6,014,491 A | 1/2000 | Hair ............ 386/31 |
| 6,025,868 A | 2/2000 | Russo |
| 6,029,141 A | 2/2000 | Bezos et al. |
| 6,052,554 A | 4/2000 | Hendricks et al. |
| 6,067,107 A | 5/2000 | Travaille et al. ........ 348/1 |
| 6,067,532 A | 5/2000 | Gebb ............ 705/37 |
| 6,073,372 A | 6/2000 | Davis ............ 40/124.16 |
| 6,081,785 A | 6/2000 | Oshima et al. ........ 705/1 |
| 6,091,883 A | 7/2000 | Artigalas et al. |
| 6,115,348 A | 9/2000 | Guerra ............ 369/112 |
| 6,119,096 A | 9/2000 | Mann et al. |
| 6,148,142 A | 11/2000 | Anderson |
| 6,148,428 A | 11/2000 | Welch et al. |
| 6,150,964 A | 11/2000 | McLaughlin ........ 341/59 |
| 6,233,389 B1 | 5/2001 | Barton et al. |
| 6,233,682 B1 * | 5/2001 | Fritsch ............ 713/168 |
| 6,240,401 B1 | 5/2001 | Oren et al. |
| 6,247,130 B1 * | 6/2001 | Fritsch ............ 713/171 |
| 6,424,998 B2 | 7/2002 | Hunter |
| 6,430,603 B2 | 8/2002 | Hunter |
| 6,430,605 B2 | 8/2002 | Hunter |
| 6,647,417 B1 * | 11/2003 | Hunter et al. ........ 709/225 |
| 2001/0002852 A1 | 6/2001 | Kwoh ............ 348/465 |
| 2001/0005906 A1 | 6/2001 | Humpleman ........ 725/82 |
| 2001/0010095 A1 | 7/2001 | Ellis et al. |
| 2001/0013037 A1 | 8/2001 | Matsumoto ............ 707/5 |
| 2001/0013120 A1 | 8/2001 | Tsukamoto ............ 725/5 |
| 2001/0014882 A1 | 8/2001 | Stefik et al. ............ 705/51 |
| 2001/0016836 A1 | 8/2001 | Boccon-Gibod et al. |
| 2001/0017920 A1 | 8/2001 | Son et al. ............ 380/212 |
| 2001/0018742 A1 | 8/2001 | Hirai ............ 713/193 |
| 2001/0018858 A1 | 9/2001 | Dwek ............ 84/609 |
| 2001/0023416 A1 | 9/2001 | Hosokawa ............ 705/51 |
| 2001/0023417 A1 | 9/2001 | Stefik et al. ............ 705/57 |
| 2001/0023428 A1 | 9/2001 | Miyazaki et al. ............ 709/201 |
| 2001/0024566 A1 | 9/2001 | Mankovitz ............ 386/83 |
| 2001/0025259 A1 | 9/2001 | Rouchon ............ 705/26 |
| 2001/0027561 A1 | 10/2001 | White et al. ............ 725/1 |
| 2001/0029491 A1 | 10/2001 | Yoneta et al. ............ 705/53 |
| 2001/0029538 A1 | 10/2001 | Blockton et al. ............ 709/226 |
| 2001/0030660 A1 | 10/2001 | Zainoulline ............ 345/720 |
| 2002/0073038 A1 | 6/2002 | Oshima et al. ............ 705/57 |

FOREIGN PATENT DOCUMENTS

| | | | |
|---|---|---|---|
| EP | 0 954 176 A2 | 11/1999 | ............ H04N/7/16 |
| EP | 0 954 179 A2 | 11/1999 | ............ H04N/7/173 |
| EP | 0 975 111 A2 | 1/2000 | |
| EP | 0 977 389 A2 | 2/2000 | ............ H04H/9/00 |
| EP | 0 984 631 A1 | 3/2000 | |
| EP | 0 994 470 A2 | 4/2000 | |
| EP | 1 104 195 A2 | 5/2001 | |
| EP | 1 143 721 A1 | 10/2001 | |
| JP | 360253082 A * | 12/1985 | |
| TW | 89117223 | 8/2000 | |
| TW | 90101479 | 1/2001 | |
| TW | 90104727 | 3/2001 | |
| WO | WO 91/03112 | 3/1991 | |
| WO | WO 94/13107 | 6/1994 | ............ H04N/7/16 |
| WO | WO 96/26605 | 8/1996 | |
| WO | WO 96/34467 | 10/1996 | ............ H04H/1/00 |
| WO | WO 96/34494 | 10/1996 | ............ H04N/7/173 |
| WO | WO 99/18727 | 4/1999 | |
| WO | WO 00/05886 | 2/2000 | ............ H04N/7/16 |
| WO | WO 00/07368 | 2/2000 | |
| WO | WO 00/14965 | 3/2000 | |
| WO | PCT/US00/23410 | 8/2000 | |
| WO | PCT/US01/01979 | 1/2001 | |
| WO | PCT/US01/05675 | 2/2001 | |
| WO | WO 01/41013 | 6/2001 | ............ G06F/17/60 |
| WO | WO 01/47249 | 6/2001 | |
| WO | WO 01/82625 A1 | 11/2001 | |

OTHER PUBLICATIONS

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.

"Wink Communications, Inc., Changes the Advertising Landscape," http://www.wink.com/contents/PressReleases/930709807/content.shtml, downloaded and printed on May 14, 2002, dated Jan. 21, 1999.

"Wink's History," http://www.wink.com/contents/history-.shtml, downloaded and printed on May 14, 2002.

"How Wink Works," http://www.wink.com/contents/howitworks.shtml, downloaded and printed on May 14, 2002.

"What is Wink: Examples," http://www.wink.com/contents/examples.shtml, downloaded and printed on May 14, 2002.

"The Wink System," http://www.wink.com/contents/tech_diagram.shtml, downloaded and printed on May 14, 2002.

"Wink Response Server and Wink Response Network," http://www.wink.com/contents/tech_wrs.shtml, downloaded and printed on May 14, 2002.

"ICAP and HTML (ATVEF)," http://www.wink.com/contents/tech_icap.shtml, downloaded and printed on May 14, 2002.

"Wink Studio and Wink Server Studio," http://www.wink-.com/contents/tech_studio.shtml, downloaded and printed on May 14, 2002.

"Wink Broadcast Server," http://www.wink.com/contents/tech_wbs.shtml, downloaded and printed on May 14, 2002.

"Wink Client Software," http://www.wink.com/contents/tech_engine.shtml, downloaded and printed on May 14, 2002.

"DataPlay, Inc.—Universal Recording Media—Discover," http://www/dataplay.com/jsp_files/en/discover/index-music.jsp, downloaded and printed on May 14, 2002, (Copyright 2001).

"DataPlay, Inc.—Universal Recording Media—What's Playing on DataPlay," http://www/dataplay.com/servlets/ProductList?action=productSearch, downloaded and printed on May 14, 2002, (Copyright 2001).

"DataPlay, Inc.—Universal Recording Media—What's Playing on DataPlay," http://www/dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).

"DataPlay, Inc.—Universal Recording Media—Industry," http://www.dataplay.com/jsp_files/en/industry/products-digitalmedia.jsp, downloaded and printed on May 14, 2002, (Copyright 2001).

"DataPlay, Inc.—Universal Recording Media—Industry," http://www.dataplay.com/jsp_files/en/industry/products-engines.jsp, downloaded and printed on May 14, 2002, (Copyright 2001).

"DataPlay, Inc.—Universal Recording Media—Industry," http://www.dataplay.com/jsp_files/en/industry.contentproviders.jsp, downloaded and printed on May 14, 2002, (Copyright 2001).

"DataPlay, Inc.—Universal Recording Media—Industry," http://www.dataplay.com/jsp_files/en/industry/products-contentkey.jsp, downloaded and printed on May 14, 2002, (Copyright 2001).

"DataPlay, Inc.—Universal Recording Media—Industry," http://www.dataplay.com/jsp_files/en/industry/index.jsp, downloaded and printed on May 14, 2002, (Copyright 2001).

"What's Playing on DataPlay—Everything Digital," DataPlay Micro-optical Engine Product Brochure, downloaded and printed on May 14, 2002, (Copyright 2000-2002).

"What's Playing on DataPlay—Everything Digital," DataPlay Digital Media Product Brochure, downloaded and printed on May 14, 2002, (Copyright 2000-2001).

"Onsale Invoice," http://www.onsale.com/cgi-win/invoice.exe, dated Jan. 19, 1998, printed Jan. 20, 1998, (Copyright 1997).

Onsale Packing Sheet (Jason Deep Space Series 225×60 Astronomy Telescope), received Jul. 1999.

Egghead Packing Receipt (Franklin Rex Organizer), received Dec. 1999.

"Sell Goods to Egghead.com," http://www.egghead.com/ShowPage.dll?page=hd_aboutus_sellgoods_p, printed Sep. 29, 2001.

"Demographics profile," http://www.egghead.com/ShowPage.dll?page=hd_aboutus_demo_p, printed Sep. 29, 2001.

"About us," http://www.egghead.com/ShowPage.dll?page=hd_aboutus_aboutus_p, printed Sep. 29, 2001.

"Privacy and Security Policy," http://www.egghead.com/ShowPage.dll?page=hd_policy_policyandprivacy_p, printed Sep. 29, 2001.

"Registration," http://www.egghead.com/ShowPage.dll-?page=reg_page1_ceos&S=1, printed Sep. 26, 2001.

"New Credit Information," https://secure.fairmarket.com/secure/Cre...FM1001, printed Sep. 26, 2001.

"Quadrant 256MB, PC133 (PC-100 Compatible), 32×64, 7ns, 168-Pin, SdRAM DIMM Module (New)," wysiwyg://253/http://auctions.egghead.com...LotNo=65659811&BatchNo=0, printed Sep. 24, 2001.

"Ashton Digital VisionGate 52 15.1' TFT-LCD, Pivot Screen, USB Hub, w/ Speakers," wysiwyg://253/http://auctions.egghead.com...LotNo=66044439, printed Sep. 26, 2001.

"Login/Logout," http://www.egghead.com/ShowPage.dll-?page...44439, printed Sep. 29, 2001.

"Enter Your Bid," wysiwyg://218/http://auctions.egghead.com...5a99, printed Sep. 29, 2001.

"Enter Your Bid," https://auctions.egghead.com/scripts/...LotNo=66044439, printed Sep. 29, 2001.

"Confirm Your Bid," wysiwyg:/220/http://auctions.egghead.com...ShipCountry=US, printed Sep. 29, 2001.

"Bid Receipt for Bid No. 5270411," wysiwyg:/220/http://auctions.egghead.com...KioskListing=0, printed Sep. 29, 2001.

"Universal Product Code(UPC) and EAN Article Numbering Code (EAN) Page," http://www.adams1.com/pub/russadam/upcode.html, by Russ Adams, printed Sep. 24, 2001.

"Internet Archive Way Back Machine– Searched for http://www.egghead.com," printed Apr. 8, 2002, (Copyright 2001).

"Internet Archive Way Back Machine– Searched for http://www.onsale.com," printed Apr. 8, 2002, (Copyright 2001).

"Calimetrics' Multilevel Technology Enables Higher-Performance CD/DVD Recorders: An IDC White Paper," Wolfgang Schlichting, (Copyright 2000).

"Making Digital Cinema Actually Happen– What it Takes and Who's Going to Do It," Steven A Morley, (Copyright 1998).

"Streaming Onto the Movie Screen, with Nary a Scratch," Karen J. Bannan, The New York Times, May 9, 2002, p. E5.

* cited by examiner

FIG. 1

| Step | Mode Name | Description | Hardware Involved |
|---|---|---|---|
| 1 | Selection | Customer looks at recently updated "catalog" of available music selections on his TV using the graphical user interface. Use remote to page through information. | User station, remote, customer TV, stored catalog |
| 2 | Ordering | Customer uses user station, remote and TV screen to order standard or customized CD. Order communicated to central controller by Internet or modem. Central controller issues decoding and encryption key(s), selection locations and order number to user station for preview. | User station, modem/Internet, remote, customer TV |
| 3 | Downloading | Music selections are downloaded during early morning transmission hours as encrypted, compressed files through customer's satellite dish and receiver to hard disk in user station. User station selects correct TV channel on receiver using IR link interface | User station, satellite receiver, video output |
| 4 | Decoding | User station uses decoding key(s) to decode downloaded file(s) so that full quality music is on disk drive (or other storage medium) in user station. Customer order number is hidden within this music based upon encryption information received during ordering process. | User station |
| 5 | Previewing | Brief portions of downloaded selections may be "previewed" by the customer along with the entire selection that has been "hobbled" by removing information to degrade music quality and prevent reconstruction of music. | User station, remote, customer's amp, speakers and TV |
| 6 | Playing | Customer plays full-quality selection through his hi-fi or TV sound system with post billing back his account via later modem/Internet communication with the central controller. Playing may include graphics, written jacket information, or hearing impaired cues shown on customer's TV. | User station, remote, customer's amp, speakers and TV |
| 7 | CD Delivery | Full-quality CD that can be heard on any CD player is burned with order number (ID tag) hidden in the music. (Burning process does not need to be quick.) | User station, CD burner, customer supplied CD |
|  | Account Setup | Happens when customer buys and hooks up the user station. |  |

MUSIC DISTRIBUTION SYSTEM AND ASSOCIATED ANTIPIRACY PROTECTION

This application is a continuation-in-part of co-pending U.S. patent application Ser. No. 09/476,078 filed Dec. 30, 1999 entitled "Video and Music Distribution Sytems"; which is a continuation-in-part of U.S. patent application Ser. No. 09/436,281 filed Nov. 8, 1999 entitled "Video Distribution System"; which is a continuation-in-part of co-pending U.S. patent application Ser. No. 09/385,671 filed Aug. 27, 1999, entitled "Video Distribution System."

FIELD OF THE INVENTION

The invention relates to music distribution and, more particularly, to music distribution systems with built-in safeguards for the prevention of piracy. In certain embodiments, music is blanket transmitted (for example, via satellite downlink transmission) to each customer's computer-based user station. Customers preselect from a list of available music in advance using an interactive screen selector, and pay only for music that they choose to record for unlimited playback. An "ID tag" is woven into the recorded music so that any illegal copies therefrom may be traced to the purchase transaction.

DESCRIPTION OF THE PRIOR ART

Throughout the world today, piracy of software, music and video materials causes significant economic losses to the originators and distributors of these art forms.

Issues of music and video piracy are strongly influenced by the available recording technology. Early forms of music distribution utilized plastic records. The manufacture of records was relatively expensive, requiring the capital expense of record presses and creating metallic master molds. Mold costs had to be amortized over large numbers of copies. The cost of mold masters limited the potential profit from making and selling illegal copies.

With the development of magnetic tape recording, the cost of manufacturing copies became primarily the cost of the raw materials. Copies could be made directly from an original with costs split between the manufacture of a blank tape and the time required to record music on to each tape copy. The manufacture of lower numbers of copies for specialty music was possible and the costs of manufacturing (a pair of tape recorders and some blank tapes) made copying feasible for an individual. However, the degradation in quality from generation to generation of copies was a deterrent as well as the time required to record each copy. The degradation of the sound consisted of loss of high frequencies, a relatively poor signal-to-noise ratio of the recording ("hiss") and tonal or volume variations due to mechanical transport of the tape across the recording head ("wow" and "flutter").

Digital compact disk technology (CD's) again changed the piracy situation by making available high-quality copies of music to consumers in digital form that could potentially be copied with no change or degradation of sound quality. CD's use 16-bit, 44 KHz digital technology so that music recorded on a CD has excellent signal-to-noise ratio, flat frequency response that is wider than human hearing, and no constant or varying pitch distortion. The introduction of CD technology caused significant concern among content providers about the risks of circulating library-quality copies of their music. Small-scale piracy of CD's became common as consumer music "boxes" were sold that had CD players feeding tape recorders. These units allowed CD's to be easily copied although without the full sound quality and convenience of the original CD. On a larger scale, bulk pirate copies of CD's were available, particularly in foreign countries, by companies using relatively expensive CD presses. The presses allowed exact copies of CD's to be made from originals using inexpensive blanks. These same presses also allowed low-cost copying and duplication of software CD's.

Very recently, concerns about music piracy have increased as low-cost CD "burners" became available to consumers making it possible for personal computers not only to read and play music CD's, but also to make copies using relatively inexpensive blank write-once CD's. Today burners are available for under $200 and CD blanks for about $1 each. Coupled with multi giga-byte hard disks, copying and editing CD's is widely available.

Today, the threat of copyright violation limits CD piracy. However, due to the cost of prosecution and the difficulty of tracing and confirming the origin of copies, this threat is only practically enforceable against major producers who are caught importing large quantities of CD's, and not individuals or small-scale pirates (e.g., teenagers with computers). As the price of CD burners and writeable CD's continues to fall, music piracy may result in increasing losses in revenue to content providers, especially if the teenage culture (that buys so many CD's) embraces piracy and kids get used to seeing CD's without boxes or colorful paintings on the CD's.

A second technological revolution is also influencing piracy. This is the ability to "compress" the amount of digital data needed to store or communicate music (or video). A one-hour music CD requires about 600 megabytes of data (16 bits/sample*44100 samples/sec*3600 sec*2 channels). This large amount of data has discouraged communication of CD's over the Internet, and storage of the CD in hard drives. However, MPEG 1 compression technology reduces the data capacity by a factor of 8 for CD music, making it easier and cheaper to communicate and store. As a result of compression technology it is now economically feasible to communicate music with CD quality over the Internet or to transmit it directly to consumer receivers from satellites. (Similar technology allows a 100-fold compression of video signals making direct-satellite TV and DVD recordings possible.) Furthermore, businesses that sell CD's by shipping them as compressed data streams to a customer's PC with a CD writer to make a final copy will make it common for CD's not to have the elaborate paint jobs of store-sold CD's and the potential to cause a sudden rise in piracy. It also should also be noted that compression depends upon and has caused powerful digital processing engines to be placed at reception sites for compressed audio or video. These engines make possible the running of protected software (protected software is software that runs the engine but can not be analyzed by outsiders to see how it works or does the encoding or decoding) that can be used for de-encryption or be capable of performing the spectral analysis to add the more complex ID tags that can be used as an aspect of this invention.

Content providers are reluctant to make full-quality music available to consumers via direct satellite broadcasting or the Internet because of the risk that exact copies of their materials, their core asset, will leave their control and freely circulate among consumers resulting in huge losses in revenue to distributors and artists. This financial threat could weaken the recording and entertainment industry in the United States.

SUMMARY OF THE INVENTION

The present invention provides music distribution systems that are beneficial to all involved parties, namely consumers, content providers and data transmission providers. In preferred embodiments, consumers are able to preselect music selections from as many as 400,000 to 500,000 song titles (30,000 to 40,000 CD's) that are transmitted daily. Customers of the music distribution system utilize a menu driven, graphical user interface with simplified controls that provide music selection by title and category (e.g., jazz, classical, rock, etc.). Music content is transmitted via direct broadcast satellite (DBS) in an encoded format directly to each customer's receiving dish or antenna which is linked to the customer's user station where it is initially stored on a suitable storage medium such as a disk drive. The customer may "preview" the stored music for free and thereafter decide whether to purchase a permanent copy. If the purchase decision is made, a full quality CD is recorded via a CD burner that is part of the user station. The customer is billed by the music distribution system operator. Antipiracy protection is provided by weaving an ID tag into the recorded music so that any illegal copies therefrom may be traced to the purchase transaction.

BRIEF DESCRIPTION OF THE DRAWINGS

Some of the features of the invention having been stated, other features will appear as the description proceeds, when taken in connection with the accompanying drawings, in which.

FIG. 2 shows the operational sequence for use of the music distribution system of FIG. 1 by a customer.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

1. The Overall Music Distribution System, Generally

Figure 1:
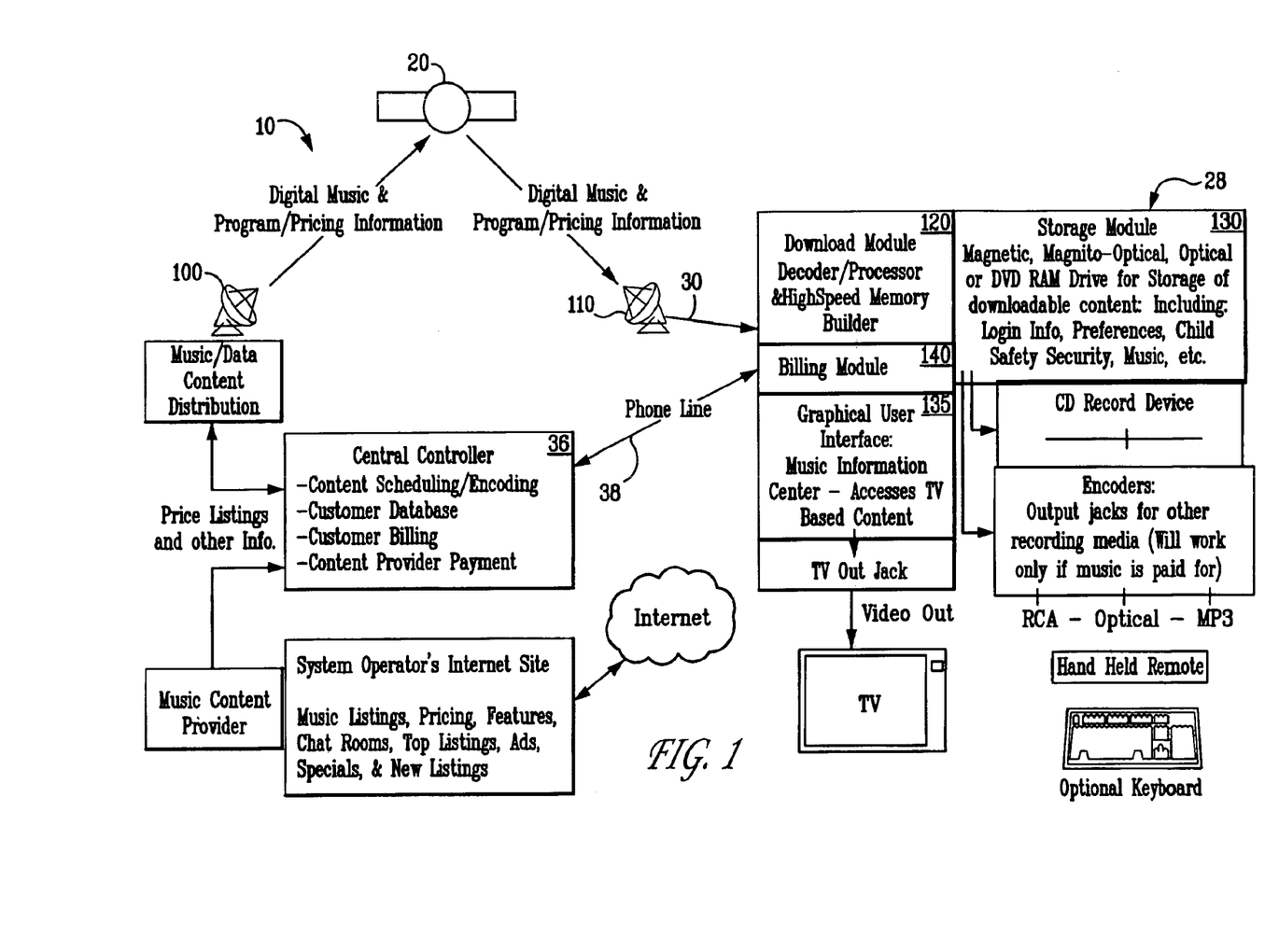
FIG. 1 is a schematic representation of a satellite-based music distribution system.

Referring to FIG. 1, there is shown a simple schematic of one embodiment of a music distribution system 10 of the invention. System 10 utilizes direct broadcast satellite (DBS) transmission via satellite 20 as the means for blanket transmitting encoded data, either in real time or in time compressed format (discussed below). The program data is received at each customer household by a receiving antenna or dish 110. Dish 110 is linked to a dedicated "box" or user station 28 by a satellite receiver link 30. User station 28 is an interactive device permitting customers to preselect desired music selections for recording through the user station. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected music selection has been recorded. Central controller system 36 utilizes this information to bill customer households and also to credit the accounts of content providers. The satellite link (or alternatively the central controller system 36) periodically communicates with each customer household to provide information on available music and program/pricing information.

Further details of the distribution system are provided below and in commonly owned U.S. patent application Ser. Nos. 09/385,671; 09/436,281 and 09/476,078, the teachings of which are fully incorporated herein by reference.

2. The Satellite(s)

According to preferred embodiments of the present invention, data transmission is achieved utilizing geostationary satellites operating in the KU band that are downlinked to conventional receiving antennae or dishes located at the customer households.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for data transmission at either real time or timecompressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's video distribution).

3. Data Transmission Parameters

EchoStar's DISH 500 system provides a very high band width of approximately 4 megabits/sec for each channel (23 megabits/sec per transponder), for a total transmission capacity of approximately 2000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate that is acceptable for those applications of the invention where lower video and audio resolution is not an important consideration to the customer. Thus, the use of high power transponders (e.g., 240 watts or higher) in conjunction with higher level polarization (e.g., quanternary) permits music distribution systems of the invention to be implemented utilizing less of the DBS system's total transmission capacity, permits the transmission of a greater number of music selections or other content and permits greater time compression of the transmitted data, or a combination of the above, all to the benefit of consumers.

4. Details of the User Station and Operation

Referring again to FIG. 1, music content providers deliver music in digital form to the central controller 36 of the music distribution system. The content is encoded utilizing an encoding technology that is well known in the art, such as interlaced coding techniques in combination with a unique header code that identifies each title. In certain embodiments, only the unique header coding is employed to identify each specific title. It is also understood that the header code can also identify the exact transmission time of each title. The header code containing transmission times can be digitally communicated to the operating system of the user stations 28 to prevent unauthorized reception and subsequent duplication of digital music content. In addition, it is also understood that selection of a specific title by the user can require a completed payment before activation of initial reception and storage of the digital music content, or before the digital music content is recorded on any other device or media.

The encoded music content is scheduled and transmitted to the direct broadcast satellite up-link facility 100 by the system operator through central controller 36. In addition, periodic digital program/pricing information is transmitted to the up-link facility, for example, every ten minutes. While it is understood that direct broadcast satellite transmission currently operates in the KU Band, other frequencies can also be employed to achieve similar results. It is understood that the music content can be transmitted at real or time compressed speeds. In preferred embodiments, music content is transmitted at faster than real time speeds, where real time speeds refer to the playback speed of the recorded music. For example, a single satellite transponder capable of 23 megabits/sec transmission can transmit a typical 4 minute song in less than 4 seconds. Thus, EchoStar's DBS programming capacity (discussed above) allows transmission of 400,000 to 500,000 song titles (approximately 30,000 to 40,000 CD's) during a four hour period, most preferably curing a period of low viewership, e.g., 1:00 AM to 5:00 AM.

The digital music content and program/pricing information, once received by the appropriate satellite, are then transmitted down broadly (i.e., "blanket transmitted") to geographic coverage areas where the user stations can receive the downlink transmissions.

The music program and pricing information are received by the home user's satellite dish 110 and transmitted to download module 120 contained in the user station where it is decoded and stored digitally in storage module 130 also contained in the user station.

The customer preselects music content to be downloaded by selecting the content utilizing the graphical user interface 135 shown on the TV screen. The order is communicated to central controller 36 by Internet or modem. Pricing information for the preselected music content is then transmitted to the billing module 140 contained in the user station where it is stored in nonvolatile memory such as SRAM for subsequent querying via the phone line by central controller 36.

The music content preselected by the customer is blanket transmitted by satellite 20 at the scheduled time and is received by the home user's satellite dish 110. This music content is transmitted to download module 120 where it is decoded and stored digitally in storage module 130.

In certain embodiments, the user station 28 will also contain an audio speaker system (not shown) to allow the customer to "preview" the stored music before it is recorded permanently on a CD or other recordable medium and subsequently paid for. In this embodiment, the preselected pricing information stored in billing module 140 will not be transmitted for payment to the system operator until the customer has either listened to the music content a set number of times, for example, 3 times, or the customer indicates via the graphical user interface that he wishes to permanently record it. As an alternative, previewing may be accomplished by playing a highly compressed "preview" copy through the customer's speaker system or headphones. Highly compressed material lacks richness, signal to noise ratio, stereo channels and high-frequency bandwidth. Preview can be communicated in perhaps 1% to 10% of the final copy depending upon the compression schemes used. Each preview has a brief section (20 seconds) of the real sound of the selection to allow the customer to really sample the material as well as generate interest in paying for a "good copy". If desired, the preview material may be further hobbled with some simple distortion, added noise, limited low end, crackles and pops, voice overlay, missing sections, sliding notches, amplitude compression. Content providers may be given choice as to the nature of the hobbling beyond the heavy transmission compression.

When the customer decides to purchase the music, the graphical user interface prompts the customer to insert a recordable medium such as a writeable CD into the user station, or attach other recording device to the user station's output connectors. (In certain cases, the customer may choose to record preselected music content multiple times. In such cases the music content provider may offer pricing discounts for multiple recordings.) The user station records the preselected music content stored in the user station and then either deletes the music contained in storage module 130 once the recording has been completed or allows the customer to manually delete content no longer desired.

The customer accesses (or navigates) the graphical user interface via a hand held remote. In preferred embodiments, the remote control communicates via infrared LED transmitter to an infrared sensor contained on the user station. An optional keyboard can be utilized by the customer to access (or navigate) the graphical user interface via the same infrared sensor contained on the user station.

The above sequence of operation is summarized in FIG. 2, which is largely self explanatory. The illustrated modes of operation, following account setup, are identified as:

1. Selection
2. Ordering
3. Downloading
4. Decoding
5. Previewing
6. Playing
7. CD Delivery.

Figure 3:
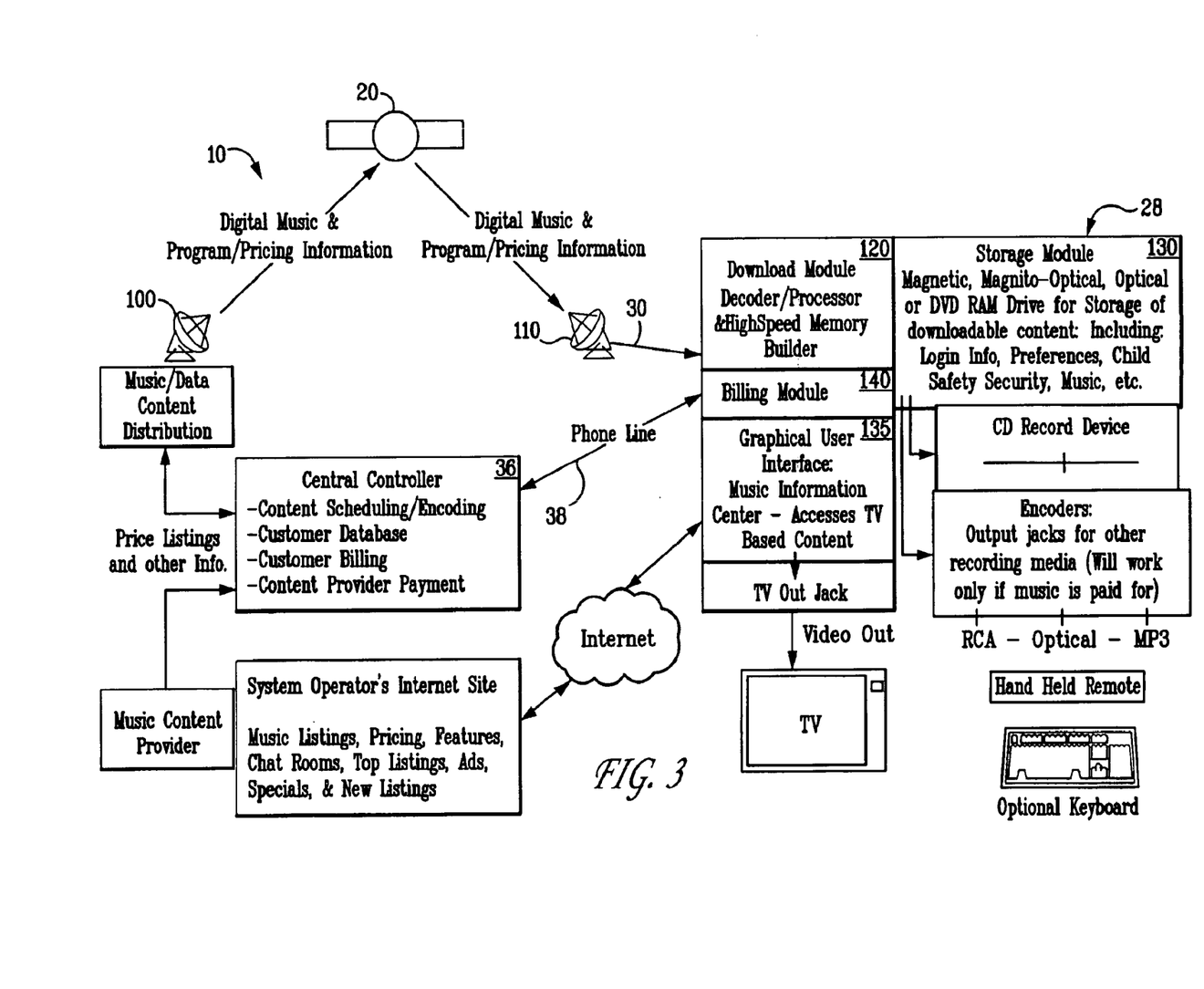
FIG. 3 shows another music distribution system wherein the user station includes an Internet browser and processor enabling customers to access the system operator's music Internet site via phone line or Internet connection.

FIG. 3 illustrates another embodiment wherein the user station contains an Internet browser and processor that enables the customer to access the system operator's music Internet site via phone line or other Internet connection.

Figure 4:
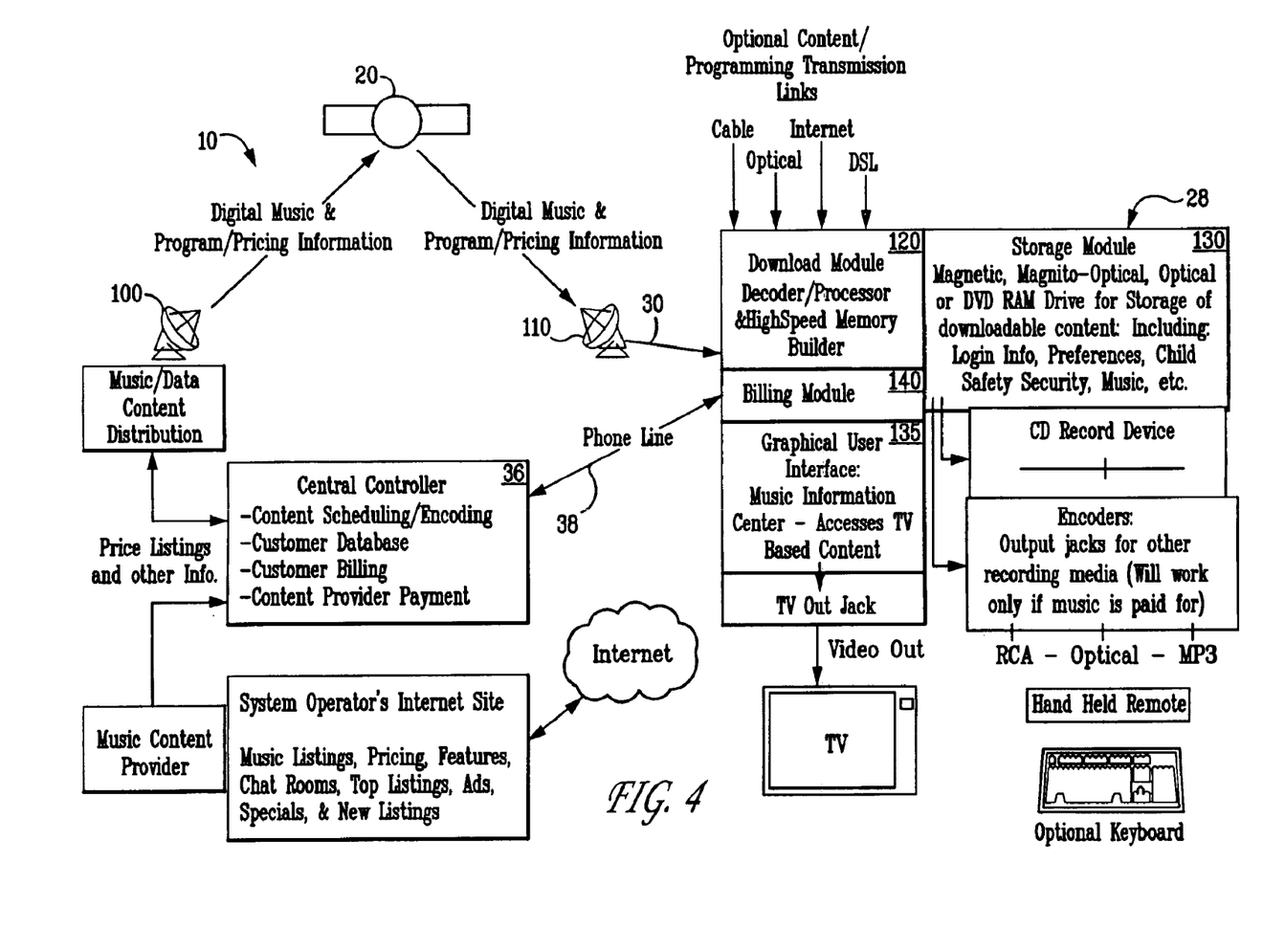
FIG. 4 shows yet another music distribution system depicting optional content/programming transmission links.

Optional digital content/programming transmission links are shown in FIG. 4. These include, but are not limited to, cable, optical fiber, DSL and the Internet.

5. Piracy Protection

The threat of piracy can be controlled through a music distribution system that uniquely labels every legal CD copy of music (or video) with an "ID tag". Thus, if a customer sells copies of a CD that he purchased, that copy and any copies of it can be traced to his original purchase. Such identification serves as the basis of a legal deterrent for large or small-scale piracy. Furthermore, the ID tag may be contained in each song of a CD protecting each complete piece of artistic material. The ID tag may be as simple as an inaudible millisecond blip at the start of each selection or may be "woven" into the music so that it survives re-recording and compression schemes by being integral to the music, but not noticeable to the listener or easily discovered by potential pirates. Multiple hidden tags may be used to discourage attempts to remove the code by comparing multiple legal copies of the music. Similarly, multiple tags also provide the advantage of identifying illegal copies in those cases where a pirate successfully removes some, but not all, of the tags. At worst, a pirate may successfully remove part of the tags making it possible to determine that the music copy is illegal, but without identifying the original purchaser.

Distributing music that contains unique ID tags limits piracy by making it possible to prove that a CD is an illegal copy and makes the legal source of the copy identifiable. This technology makes it financially feasible to distribute full-quality CD music (or video) to consumers via direct satellite connections in the manner described above in connection with FIGS. 1–4. Furthermore, by placing tags in each song, it makes it possible to have a protected system of allowing consumers to create unique assortments of songs on a CD, and for artists and distributors (content providers) to receive revenues for each song used. Thus, each home can become a "CD or music factory" where a person can create their own collection of songs by artists, through a system in which the original artist and distributor are properly paid for their materials. Furthermore, the decline in piracy resulting from the threat of legal prosecution could result in more legal copies of music being purchased so that providers can charge less per legal copy so that this art is more widely available.

The two major venues for distribution of protected CD's are the Internet and satellite. In the Internet case, a customer contacts an Internet site where they purchase the CD. The site places ID Tags in the music or video selected, then compresses the selection and sends it to the purchaser. The purchaser then de-compresses (inflates) the selection and stores it on his hard drive or writes it to a blank CD for later playing. In the case of satellite distribution, a customer contracts over a phone or Internet connection to purchase a particular CD. At regular intervals, perhaps once a day, the satellite company compresses this CD, encrypts it and then blanket broadcasts it. The customer's receiver (e.g., user station 28, above) stores the transmission and then de-encrypts it using a system and key supplied by the satellite company, and then that same system encodes an ID TAG in the music (or soundtrack) using a TAG number downloaded from the satellite company during the purchasing transaction. Both the Internet delivery system and the satellite delivery system create a customer CD that may be played on any conventional CD player. Both the Internet and satellite distribution systems archive the ID Tag information with the customer's identity and perhaps other aspects of the transaction. This data may be sent back to the original content provider or to another company specializing in detecting and prosecuting pirates.

The above scheme may also be applied to CD's sold in stores. In this case, each CD has a unique ID tag encoded before it is distributed to the store. The CD case has a bar code associated with the ID Tag. At the time of purchase the bar code is associated with a customer's charge card or identity. This information is then sent back to the CD manufacturer.

It will be appreciated that it is possible to encode an ID TAG into a music selection so that it will not be heard during normal playback, but could remain and be detectable in a recording made from a selection played over the radio.

The description will now turn to a detailed discussion of representative ID tags. As stated above, an ID tag uniquely identifies each copy of music or video. In its most simple form, a 10 digit (37 bit) tag may be stored in three 16-bit samples ($1/12,000$ of a second long) on a CD. A three-byte tag number equivalent to full volume is a barely perceptible pop to young, sensitive ears and is completely inaudible to the majority of the population. In a more complex form, the tag may be woven into the frequency or time spectrum of the music, where it is both inaudible and survives compression and transmission, or even serious attempts by hackers to remove the tag. While the simple tag may be appropriate for certain applications, more complex tags may be desired for other applications, especially for high-profit, piracy-prone contemporary music (or video).

A simple tag, as discussed immediately above, may consist of three 16-bit numbers placed at the start and/or end instant of a CD or each of its songs. To limit audibility, the 37 bits may be carried by the 64 bits of the first four samples at the beginning of the CD and encoded to have low amplitude or alternating polarity to further hide its audible presence from consumers. Such a tag may be easily read by a computer and is not difficult to eliminate when making copies. However, the technical nature of tag removal coupled with the legal implications of distributing software capable of destroying the tag serves as a significant deterrent to general piracy.

The complex ID tag is inaudible by humans, yet is sufficiently integral to the music (or video) that it remains during simple filtering or compression operations. The ID tag may be a multidigit number (or collection of bits) that can be read or recovered from the CD by those who originally placed the tag. Examples of tags are low bit-rate encoding in low amplitude, high frequency music content, short-duration ratios of harmonic components, background sounds, slight shortening or lengthening of sustained sounds, or even small shifts in localization cues for a sound object. Key to "hiding" the sounds is to encode the bits as short duration shifts in the sounds, shifts that are preserved during compression but that are not detectable by normal human hearing or attention. In other words, it is desirable to take advantage of the parts of the music that have "excess information" coded during sound compression that is not noticed by humans.

To make the complex tag hidden and recoverable additional information must be used in reading the tag that is not contained in the CD. This information describes where the real (or perhaps false) ID tags are to be placed, and what the nature of the bit encoding is at that location. The simplest form of location would be milliseconds from the start or end of the song for each bit. Similarly, time from a particular feature in a song, like milliseconds after the attack greater than 20 dB about 23 seconds into the song, could be used to identify the location of one bit of an ID tag. Obviously many bits are also encoded that obscure the actual tag bits. Real and actual bits may be different or interchanged among different legal copies of a song.

It should be expected that as music (or video) compression techniques evolve, methods for placing and retrieving ID tags will also evolve.

How and where is the ID tag placed? In its simplest form, the ID tag is a unique identifying number, ID NUMBER, that is placed at the start, end or between selections on a copy of the CD when it is produced for the consumer. As stated above, a unique ID NUMBER might be placed on each CD as it is manufactured and later associated with a customer name or credit card during a store purchase. Or, in one preferred manner of carrying out the inventions, the ID NUMBER might be inserted during the process of writing a CD with music that is downloaded from a satellite or the Internet. In this case, the software accomplishing the transaction to purchase the music also sees that the ID NUMBER is obtained from the seller and places this ID NUMBER at appropriate places in the CD during the recording process.

Looking at a more complex form of the ID tag, when a legal CD is distributed over the Internet, via direct satellite transmission or even CD's that are manufactured for sale in CD stores, preferably two blocks of information are involved. The first block, called the "location data", is an encrypted description of all the locations in the music to contain the entire or part of the ID tag, and the encoding techniques used for each location in which false or real bits of the ID tag will be placed. The LOCATION DATA is used in creating or reading the ID NUMBER but is not stored on the CD. The second block of information, called the ID number, is a unique number identifying the legal transaction. The ID number may be a customer identification number, like a credit card or phone number, or customer purchasing account number, or may be a seller generated transaction number. There are many different schemes for filling redundant ID tags encoded on a CD so that tampering or removal of any tag or part of a tag is noticed.

Some types of tags may be placed in the time domain and others in the frequency domain. Time domain tags may involve changing an aspect of a time-domain feature like the decay time for a note, whereas frequency domain features such as amplitude of an overtone would be better inserted in a frequency domain transform like the fast Fourier transform used to do MPEG 1 compression. The amount of computer speed needed to insert frequency domain tags has only been recently available in consumer computers.

LOCATION DATA is communicated to a "home music factory" (e.g., user station 28) as encrypted information sent with the compressed music. If an ID NUMBER were 10 digits (about 33 bits) long then perhaps just 33 or several hundred locations would be contained in the LOCATION DATA. Software may accomplish this task at the site of music distribution, picking regions of the sound that are suitable for hiding bits within, or trial bits may be encoded by software with trained observers, perhaps the person who mixed or originated the music confirming that the music was not degraded by the inclusion of the bits.

ID NUMBER would be contained in the music factory as a standard ID number or as a number securely given to the purchaser during the purchase transaction. One number might be given for a whole CD or individual numbers for each song on the CD might be given.

The customer's security information should not only contain the LOCATION DATA and ID TAG but instructions for creating each type of encoding of a bit in the fabric of the music. Types and encoding of bits needs to be kept a secret so that the search and removal of encoded ID's will be more difficult. It is also likely that types of encoded cues will evolve over time.

Note that a unique ID tag can be encoded in the manufacture of a CD for sales in a store as well as a bar coded copy on the CD box allowing association of a purchaser's identity (or credit card number) with that legal copy. Similarly CD's delivered in compressed form over the Internet can have the complex tags woven into the audio at the delivery end. Complex tags can be designed that are not affected by the compression-decompression process.

How are the ID tags immune from destruction? The simple ID TAG consisting of three two-byte samples could easily, but illegally, be eliminated during a piracy operation with the proper software. However the more complex encoding schemes are very difficult to find in order to eliminate or change it.

To be immune from destruction the encoded bits should not affect a person's perception of the music. This is not difficult since the information content of even compressed music is orders of magnitude beyond the capacity of humans to take in information. However, since humans attend to different aspects of music at different times, encoding must be carefully done.

Hints of types of acceptable encoding come from knowledge of what aspects of sound are most carefully attended by humans. For example, quick rise-times or strong attacks are carefully processed for localization cues, and frequency or pitch can be sensed with great accuracy by some persons. The literature on the development of music compression algorithms contains discussions of what aspects of music must be carefully preserved and what is less noticed but nevertheless kept due to the need to preserve other, similar, features in the encoding.

It will be appreciated that it is possible to place both a simple and a complex ID number on a CD as a method to determine the purchaser of a CD that was subsequently altered and copied.

6. Business Models

Figure 5:
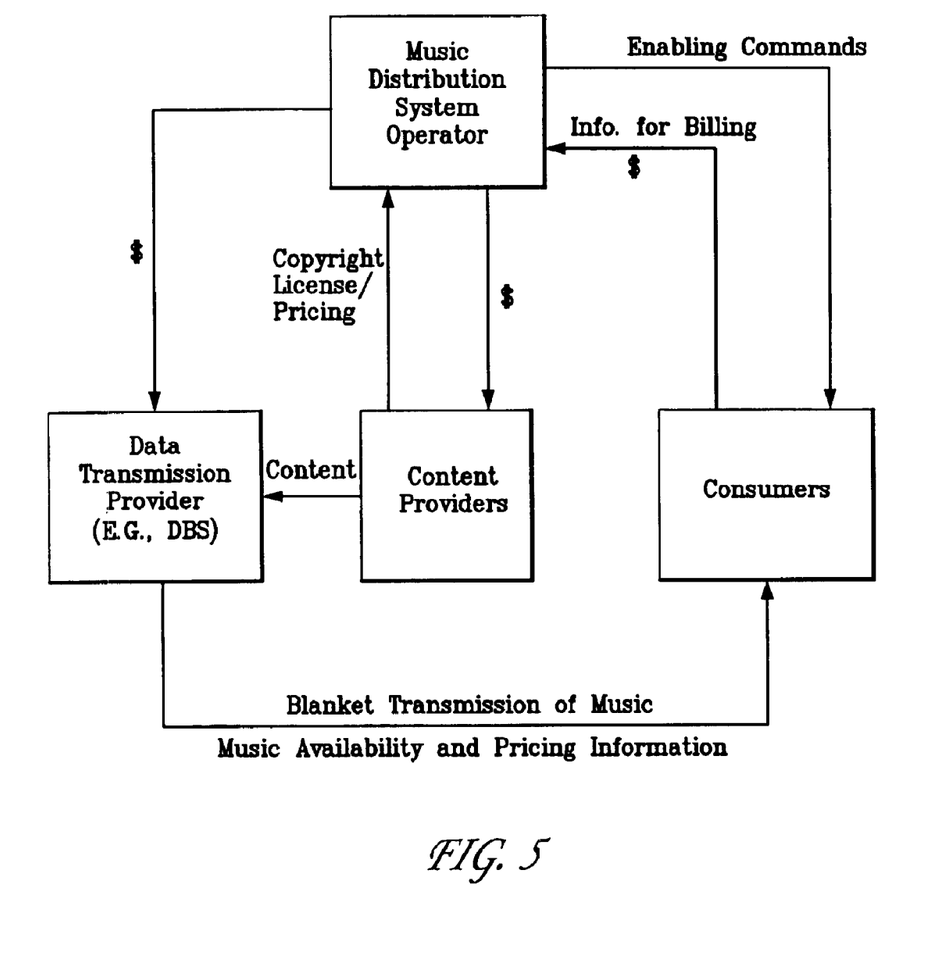
FIG. 5 is a block diagram of one simplified embodiment of a business model for commercializing a music distribution system.

The present invention provides significant flexibility with respect to the business model to be used to commercialize the invention. In one simplified embodiment, shown in block diagram form in FIG. 5, the music distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the video distribution system operator. Both the data transmission provider and the content providers receive payments directly from the music distribution system operator. Lastly, the music distribution system operator periodically receives information for billing, while also sending enabling commands to the consumers.

While the present invention has been described in connection with certain illustrated embodiments, it will be appreciated that modifications may be made without departing from the true spirit and scope of the invention.

What is claimed is:

1. A system for distributing music to users, comprising:
   a transmitter blanket-transmitting a plurality of encoded digital music contents;
   a plurality of user stations comprising:
      a first input terminal receiving a user selection of a transmitted encoded music content to store;
      a module receiving and storing the selected transmitted encoded music content;
      an output terminal sending an indication of the user selection;
      a decoder operable when enabled to decode the stored encoded music content;
      a second input terminal receiving a key unique to the music content selected by the user to enable the decoder;
      an anti-piracy module to embed an ID tag in the decoded music content; and
      an output device supplying the decoded music content to the user from the decoder;
   a central controller connected to the user stations and comprising a first input terminal receiving from a user station an indication of a user selection of a transmitted music content and a first output terminal transmitting to the user station a key unique to the selected music content; and
   a billing system associated with the central controller to bill the user stations, wherein the billing system processes payment transactions from the user stations and the central controller transmits the key only if a payment transaction for the key is completed in advance of the key transmission.

* * * * *

UNITED STATES PATENT AND TRADEMARK OFFICE
CERTIFICATE OF CORRECTION

| | | |
|---|---|---|
| PATENT NO. | : 6,952,685 B1 | Page 1 of 1 |
| APPLICATION NO. | : 09/487978 | |
| DATED | : October 4, 2005 | |
| INVENTOR(S) | : Charles E. Hunter, John H. Hebrank and Kelly C. Sparks | |

It is certified that error appears in the above-identified patent and that said Letters Patent is hereby corrected as shown below:

Title Page item [56]: under References Cited, U.S. Patent Documents

Please add omitted references 5,825,354 cited March 9, 2002

EP 0 683 943 B1 cited March 9, 2002

EP 0 756 423 A1 cited January 2, 2003

Signed and Sealed this

Tenth Day of April, 2007

JON W. DUDAS
*Director of the United States Patent and Trademark Office*